United States Patent
Herrmann

(10) Patent No.: US 9,592,655 B2
(45) Date of Patent: Mar. 14, 2017

(54) METHOD AND APPARATUS FOR INLINE ADHESIVE SIGNAGE

(71) Applicant: XEROX CORPORATION, Norwalk, CT (US)

(72) Inventor: Douglas K Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 118 days.

(21) Appl. No.: 14/530,859

(22) Filed: Nov. 3, 2014

(65) Prior Publication Data

US 2016/0125768 A1    May 5, 2016

(51) Int. Cl.

| | | |
|---|---|---|
| *B29C 65/52* | (2006.01) | |
| *B32B 37/12* | (2006.01) | |
| *B32B 37/26* | (2006.01) | |
| *B32B 38/04* | (2006.01) | |
| *B32B 38/14* | (2006.01) | |
| *B32B 37/10* | (2006.01) | |
| *B05D 3/06* | (2006.01) | |
| *B32B 38/00* | (2006.01) | |
| *B32B 37/24* | (2006.01) | |

(52) U.S. Cl.
CPC .............. *B32B 37/10* (2013.01); *B05D 3/067* (2013.01); *B32B 37/12* (2013.01); *B32B 38/145* (2013.01); *B32B 2037/1253* (2013.01); *B32B 2037/243* (2013.01); *B32B 2305/72* (2013.01); *B32B 2310/0831* (2013.01); *B32B 2519/00* (2013.01)

(58) Field of Classification Search
CPC ..... B32B 2305/72; B32B 37/10; B32B 37/12; B32B 2037/1253; B32B 2037/243; B32B 38/145; B32B 2310/0831; B32B 2519/00; B05D 3/067; G09F 3/10; G09F 1/00; G09F 1/10; B42D 15/02
USPC ..... 40/630, 638, 661.09, 675; 156/277, 289, 156/305, 307.1, 307.3, 307.5, 307.7
See application file for complete search history.

(56) References Cited

U.S. PATENT DOCUMENTS

| | | | | |
|---|---|---|---|---|
| 5,332,265 A | * | 7/1994 | Groess ..................... | B42D 5/00 283/101 |
| 5,578,352 A | * | 11/1996 | Smith ....................... | G09F 3/10 283/81 |
| 5,975,582 A | * | 11/1999 | Treleaven ............. | G09F 3/0289 283/81 |
| 6,040,026 A | * | 3/2000 | Iwabuchi ................ | C09J 7/025 229/87.01 |
| 6,129,965 A | * | 10/2000 | Langan .................... | B31D 1/02 428/202 |
| 6,213,519 B1 | * | 4/2001 | Bosch ................... | B42D 15/02 283/101 |
| 6,461,709 B1 | * | 10/2002 | Janssen .................... | B32B 7/06 156/297 |
| 6,491,781 B1 | * | 12/2002 | Kreckel .................. | A47G 1/17 156/247 |
| 6,626,464 B1 | * | 9/2003 | Flaherty ................. | B42D 15/00 283/101 |

(Continued)

*Primary Examiner* — Sing P Chan

(57) ABSTRACT

A process to apply pressure sensitive adhesive to cut sheet media and eliminate a separate release liner. A Silicone release layer is applied (post fuser) on a top surface of the media and then UV cured. A pressure sensitive adhesive layer is applied next. The cut sheets are then stacked and a compressive force is applied that transfers the pressure sensitive adhesive from one sheet to another and helps hold the stack together.

11 Claims, 3 Drawing Sheets

(56) References Cited

U.S. PATENT DOCUMENTS

| | | | | |
|---|---|---|---|---|
| 6,830,795 B1* | 12/2004 | Downs | ...................... | G09F 3/02 |
| | | | | 283/81 |
| 2004/0001930 A1* | 1/2004 | Roth | ...................... | B31D 1/021 |
| | | | | 428/40.1 |
| 2005/0154075 A1* | 7/2005 | Siegel | .................... | B05D 3/067 |
| | | | | 522/8 |
| 2010/0116425 A1* | 5/2010 | Konsti | .................. | B65C 9/0006 |
| | | | | 156/230 |

* cited by examiner

METHOD AND APPARATUS FOR INLINE ADHESIVE SIGNAGE

BACKGROUND

The present disclosure relates to applying an adhesive to signage for store shelving, and more particularly, to an improved method and apparatus that applies an adhesive to a multi-layered media substrate after it exits a xerographic printing apparatus.

Currently, the process being used to create adhesive signage for store shelving involves applying a PSA (pressure sensitive adhesive) tape to the paper or other substrate and then printing signs on the modified substrate. The tape involves an adhesive, a release liner and a backer which leads to problems, such as: running the taped media through a printer; glue build up in the printer; feed problems due to the uneven deformation of the stack; fuser Silicone oil being unevenly deposited on the modified substrate which then migrates to the rest of the system of the printer; concerns with the paper telescoping in roll form; and final stacking of the cards due to the height of the tape. The media is 0.008", and the adhesive tape is ~0.010" leading to a total thickness of roughly 0.018" on one side and 0.008" on the other. Additionally, at a store, the tape release liner must be removed and discarded as each of the ~5K to 7K signs are placed in aisles of the store. The cost of the tape used in this process is prohibitively high.

Additionally, other adhesive signage applications include the common post-it notes that are created on pretreated roll form systems and stacked with a secondary guillotine cutting operation to cut the shapes after stacking. A microsphere adhesive is added to the bottom of the sheet with a release agent treated top side opposite the adhesive. These systems use either blank or preprinted material in roll form on large dedicated roll fed systems. The micro-sphere adhesives used in their production are not suitable to refrigeration and freezer applications and do not stand up to in-store use for the time period required. In addition, this is not done in a cut sheet process and does not address robotic or other stacking of self-adhesive signage of different shapes, sizes with variable print data.

Therefore, there is a need for an improved and less costly method and apparatus for applying an adhesive to signage for store shelving.

SUMMARY

In answer to this need and disclosed hereinafter is a unique process that applies strong pressure sensitive adhesive (PSA) to cut sheet media and eliminates use of a separate release liner. A Silicone release layer is applied (post printing) on the top surface of media that is ultra violet (UV) cured, with a PSA layer applied next. The sheets are then stacked and a compressive force is applied that transfers the PSA and helps hold the stack of sheets together.

BRIEF DESCRIPTION OF THE DRAWINGS

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

DETAILED DESCRIPTION

Figure 1:
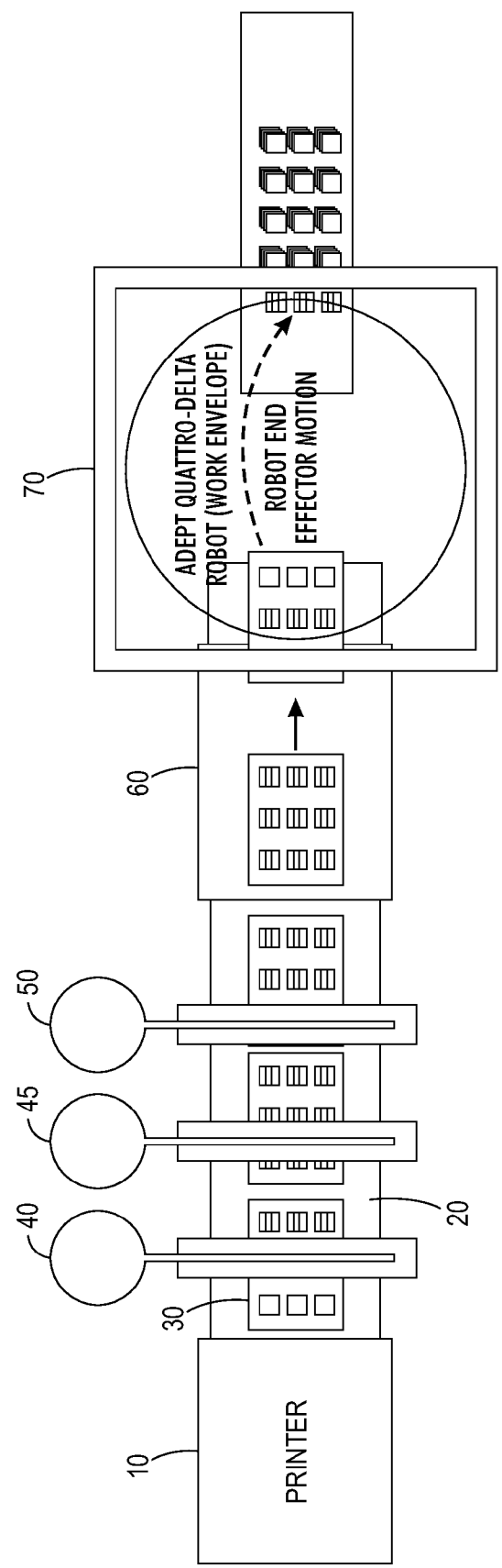
FIG. 1 is a schematic top view illustration of a process that creates multi-layered adhesive signage in-line with printer output.

For a general understanding of the features of the disclosure, reference is made to the drawings. In the drawings, like reference numerals have been used throughout to identify identical elements.

FIG. 1 is a schematic top view illustration of the process and apparatus in accordance with the present disclosure that creates multi-layered adhesive signage in-line with media output from printer 10. As is well known, in a conventional printer 10 an electrostatic latent image is created on a surface of an imaging member, such as, a photoreceptor. The latent image is developed by applying thereto a supply of toner particles, such as, with a developer roll which may be of any of various designs, such as, a magnetic brush roll or donor roll, as is familiar in the art. The toner particles adhere to appropriately-charged areas of the latent image. The surface of the photoreceptor is rotated to a transfer zone created by a transfer-detack device in the printer that is usually positioned in the six o'clock position.

At the transfer zone, the print sheet is brought into contact or at least in proximity with a surface of the photoreceptor, which at this point is carrying toner particles thereon. A corotron or other charge source causes the toner on photoreceptor to be electrically transferred to the print sheet. The print sheet is then sent to subsequent stations, as is familiar in the art, such as, a fuser and finishing devices, but in the present application is outputted onto conveyor belt 20.

Figure 3:
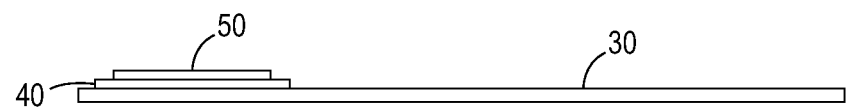
FIG. 3 is a schematic side view of a layered media that includes a pressure sensitive agent and a release agent applied thereto.
Figure 4:
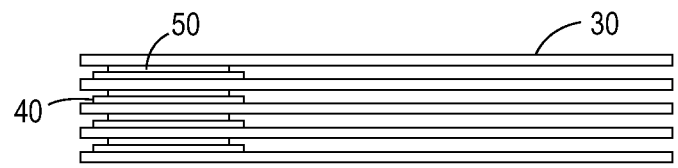
FIG. 4 is a schematic side view of layered media as shown in FIG. 3 in stack form.
Figure 5:
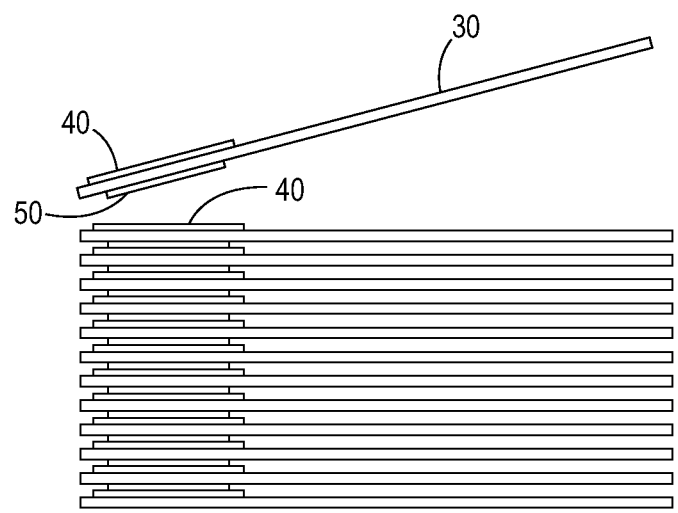
FIG. 5 is a side view of stacked adhesive signage with adhesive bonded to the bottom of the signage with a sheet being removed from the stack for a store shelf application.

The signage creation process of the present disclosure in FIG. 1 eliminates the added tape used heretofore by building a layered substrate or card as shown in FIG. 3 that includes the media 30, a release agent or coating 40 and a PSA 50 designed for this application. As the media 30 in FIG. 3 exits printer 10 of FIG. 1, it is deposited onto conveyor belt 20 where release coating 40 is added to the top surface of the media. Release coating 40 is then UV cured or fixed at 45 to prepare for the addition of the next step which is to add a PSA 50 directly onto the release agent coating 40. The new printed layered media (PSA Layer/Release Layer/Media) is then cut to size by a conventional laser 60 into cards/signage that is robotically stacked one on top of the other by a robotic system 70 that picks the cards up, places them into a stack and pressing the stack to create an adhesive stack as shown in FIG. 4. Each lower card in the stack will remain separated by the UV cured Silicone release layer. By creating this layered matrix on cards 30 with a first Silicone UV cured layer and then a top layer of PSA, the cards can be made to be stacked and later peeled from each other as shown in FIG. 5. The PSA remains on the duplex uncoated side of the top card due to the marriage of the adhesive to the fibers of the paper and the Silicone release layer remains on the top of the card below.

In practice, release agent 40 includes Silicone formulated with a pre-initiator that crosslinks with a UV cure to initiate crosslinking in the Silicone. The Silicone is added to the top of the sheet 30 in the adhesive zone after exiting the printer and then quickly flashed cured via UV at 45. PSA hot melt is then added directly to the top of release agent 40 in-line. The sheet 30 is then laser cut, guillotine cut, slit or die cut at 60 to produce sign shapes. Those shapes are then placed into stacks with a robotic system. One such system is an Adept Quattro 650 Robot made by Adept Technology, Inc., located at 5960 Inglewood Drive, Pleasant, Calif. 94588 to create ordered stacks in FIG. 4 that now become an adhered stack of signs. The stack is then pressed to allow the adhesive resident on the top release coat to migrate into the untreated/uncoated bottom of the card above. This migration of adhesive creates a marriage of the PSA into the media above. The adhesive continues to migrate and marry itself to the card above during storage and shipment to a store. At the store the signs are then peeled from the top with the adhesive adhering to the bottom of the top card and releasing from the card below due to the release agent layer as shown in FIG. 5.

Figure 2:
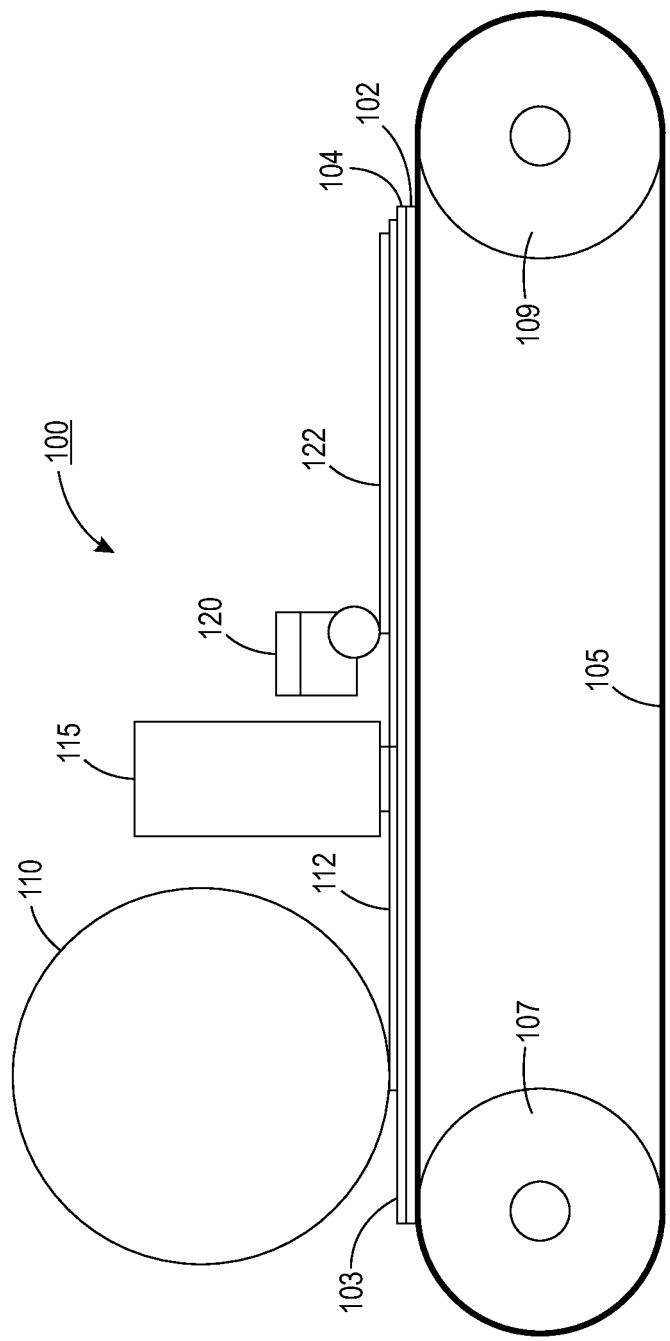
FIG. 2 is a side view of adhesive and release application to a substrate.

A side view of an adhesive release application 100 is shown in FIG. 2 that includes a media substrate 102 having an uncoated top side 103 and a coated top sides 104 supported for movement in a horizontal plane by conveyor belt 105 mounted for rotation on drive roll 107 and idler roll 109. A conventional device 110 employs a flexographic process to apply a release agent 112 onto the coated top side 104 of substrate 102. Media substrate 102 is then UV cured at station 115 and then has a pressure sensitive adhesive applied on top of the UV cured release agent 122 applied at station 120.

In recapitulation, a process and apparatus has been disclosed that eliminates the pressure sensitive adhesive tape added to paper used heretofore by creating a multi-layer media substrate in-line that has both a release and a PSA applied to the simplex side of the media post printing so the media can be efficiently stacked, held together and then peeled and adhered to the store shelving.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A method for creating in-line adhesive signage for store shelving, comprising:
    providing individual, separate and linerless substrates for receiving images,
    using a printing machine to create an image on a top surface said linerless substrates;
    outputting said linerless substrates from said printing machine;
    providing a conveyor mechanism in-line with output of said linerless substrates from said printing machine and adapted to receive said linerless substrates from said printing machine;
    providing a release agent station for applying a release agent coating only to each top surface of said linerless substrates as they exit said printer;
    providing an ultra violet curing station for UV curing only said release agent coating; and
    adding a pressure sensitive adhesive to each of said top surfaces of said linerless substrates on top of said release agent.
2. The method of claim 1, including providing said substrates as paper sheets.
3. The method of claim 2, including stacking said substrates one on top of the other.
4. The method of claim 3, wherein said conveyor mechanism is a belt.
5. The method of claim 3, wherein said substrates are stacked on top of each other and pressed to allow said pressure sensitive adhesive resident on said top release agent coating to migrate into an untreated/uncoated bottom of the substrate above with said pressure sensitive adhesive remaining on said untreated/uncoated bottom of a top card due to the marriage of said pressure sensitive adhesive to fibers of said substrates and with said Silicone release layer remaining on top of the card below.
6. The method of claim 5, wherein said pressure sensitive adhesive continues to migrate into the card above during storage.
7. The method of claim 6, cutting said substrates to said predetermined size with a laser.
8. The method of claim 1, including providing Silicone as said release agent.
9. The method of claim 8, including robotically stacking said substrates off said conveyor mechanism.
10. The method of claim 8, including die cutting said substrates to a predetermined size.
11. The method of claim 8, wherein said Silicone is formulated with a pre-initiator that crosslinks with said UV cure to initiate crosslinking in said Silicone.

* * * * *